United States Patent
Hinchliffe et al.

[11] Patent Number: 6,137,550
[45] Date of Patent: Oct. 24, 2000

[54] STRUCTURE FOR A PALC DISPLAY PANEL HAVING A HELIUM FILLING DOPED WITH HYDROGEN

[75] Inventors: Robert D. Hinchliffe, Newberg; Kevin J. Ilcisin, Beaverton, both of Oreg.; Mark W. Roberson, Cary, N.C.

[73] Assignee: Tektronix, Inc., Beaverton, Oreg.

[21] Appl. No.: 08/926,411

[22] Filed: Sep. 9, 1997

Related U.S. Application Data

[60] Provisional application No. 60/026,661, Sep. 30, 1996.

[51] Int. Cl.[7] .......................... G02F 1/133; G02F 1/1343
[52] U.S. Cl. ............................ 349/32; 349/139; 216/33; 216/39; 313/44-46; 313/582-585; 313/491; 438/30; 428/163; 428/164; 445/25; 445/43
[58] Field of Search ...................... 349/32, 139; 216/33, 216/39; 428/163, 164; 445/50, 51, 58, 25, 43; 313/582, 585, 584, 491, 44–46; 438/30

[56] References Cited

U.S. PATENT DOCUMENTS

| | | | |
|---|---|---|---|
| 4,727,287 | 2/1988 | Aida et al. | |
| 5,077,553 | 12/1991 | Buzak. | |
| 5,626,772 | 5/1997 | Bongaerts et al. | 216/24 |
| 5,696,569 | 12/1997 | Bongaerts et al. | 349/143 |
| 5,783,906 | 7/1998 | Moore et al. | 313/586 |
| 5,808,413 | 9/1998 | Bongaerts et al. | 313/585 |
| 5,835,167 | 11/1998 | Bongaerts et al. | 349/32 |
| 5,886,467 | 3/1999 | Kimura | 313/582 |
| 5,914,562 | 6/1999 | Khan et al. | 313/582 |
| 5,956,002 | 9/1999 | Martin et al. | 345/60 |
| 6,028,572 | 2/2000 | Ilcisin et al. | 345/60 |
| 6,057,895 | 5/2000 | Van Helleputte et al. | 349/32 |
| 6,064,153 | 5/2000 | Ilcisin et al. | 313/582 |

FOREIGN PATENT DOCUMENTS

| | | |
|---|---|---|
| 31 06 368 | 1/1982 | Germany. |
| 30 40 761 | 5/1982 | Germany. |

*Primary Examiner*—William L. Sikes
*Assistant Examiner*—Julie Ngo
*Attorney, Agent, or Firm*—John D. Winkelman; John Smith-Hill

[57] ABSTRACT

A channel structure for a PALC display panel comprises a channel member defining at least one channel, a cathode having an upper surface exposed in the channel, and an anode having an upper surface exposed in the channel. The upper surface of the anode is of substantially uniform composition and has a conductivity perpendicular to its upper surface of at least about $10^{-4}$ ohm$^{-1}$ cm$^{-1}$.

11 Claims, 2 Drawing Sheets

STRUCTURE FOR A PALC DISPLAY PANEL HAVING A HELIUM FILLING DOPED WITH HYDROGEN

CROSS REFERENCED TO RELATED APPLICATIONS

This application claims the benefit of U.S. Provisional Application No. 60/026,661, filed Sep. 30, 1996.

BACKGROUND OF THE INVENTION

This invention relates to a structure for a plasma addressed liquid crystal (PALC) display panel having a helium filling doped with hydrogen.

U.S. Pat. No. 5,077,553 discloses apparatus for addressing data storage elements. A practical implementation of the apparatus shown in U.S. Pat. No. 5,077,553 is illustrated schematically in FIG. 4 of the accompanying drawings.

The display panel shown in FIG. 4 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 4), an upper substrate 14 carrying the data drive electrodes, and an upper polarizer 16. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. In the case of a color display panel, the panel elements include color filters (not shown) between the layer 10 and the upper substrate 14. The region of the upper surface of the display panel that bounds the panel element constitutes a single pixel 30 of the display panel.

When the anode in one of the channels is connected to ground and a suitable negative voltage is applied to the cathode in that channel, the gas in the channel forms a plasma that provides a conductive path at the lower surface of the cover sheet 6. If a data drive electrode is at ground potential, there is no significant electric field in the volume element of electro-optic material in the panel element at the crossing of the channel and the data drive electrode and the panel element is considered to be off, whereas if the data drive electrode is at a substantially different potential from ground, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material that rotates the plane of polarization of linearly polarized light passing therethrough by an angle that is a function of the electric field in the liquid crystal material. When the panel element is off, the angle of rotation is 90°; and when the panel element is on, the angle of rotation is zero.

The panel is illuminated from the underside by an extended light source (not shown) that emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the liquid crystal material toward the upper polarizer 16 and a viewer 32. If the panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity that depends on the electric field, allowing a gray scale to be displayed.

There are three principal methods currently used for fabricating the channel member of a PALC display panel. In accordance with one method, a glass substrate is etched to form an array of parallel channels in its upper surface and the anodes and cathodes are then formed in the channels. Another method involves depositing layers of paste on discrete areas of a glass substrate using a screen printing process. The third method involves depositing blanket layers of material on a glass substrate and selectively removing the material by sandblasting.

The channel member 4 shown in FIG. 4 is formed using the first method described above. For ease of processing, the anodes of the channel member shown in FIG. 4 are formed at the same time as the cathodes and are of the same structure as the cathodes.

During operation of the PALC panel, the cathode is subject to sputtering by the positive ions of the plasma. It has been proposed that the cathode should be protected from sputtering damage by providing a protective top coating of refractory material over the cathode. See U.S. patent application Ser. No. 08/520,996 (Attorney Docket No. 5843 U.S.) and U.S. Provisional Patent Application No. 60/023,418 (Attorney Docket No. 5843 U.S.-1). The coating of refractory material may be composed of a rare earth hexaboride, such as $LaB_6$, in which case the coating may be deposited by cataphoretic deposition.

When the PALC display panel disclosed in U.S. Pat. No. 5,077,553 is used as a raster scan display panel for displaying an NTSC video signal, the panel is oriented so that the channels extend horizontally and the data drive electrodes extend vertically. The first active line of a frame of the video signal is sampled. A negative-going strobe pulse is applied to the cathode in the first channel to establish a plasma in the first channel, and the data drive electrodes are driven to voltage levels that depend on the respective sample values. In each panel element along the first channel, an electric field that establishes the state of the panel element is created between the data drive electrode and the lower surface of the cover sheet. The strobe pulse is removed, and the plasma is extinguished, but the electric field persists, maintaining the state of the panel element until the first channel is again addressed, on the next frame of the video signal. This sequence of operations is repeated in order for the remaining active lines of the frame and the remaining channels of the display panel.

The plasma that was created in the first channel is not extinguished instantaneously when the strobe pulse is removed, but decays over a finite interval. If the voltages for the next line of video data are applied to the data drive electrodes before the plasma in the first channel is fully decayed, the electric field that is created in a panel element along the first channel will not have the proper value, and this will generally result in a loss of image quality. Therefore, it is necessary that the plasma created in response to a previous strobe pulse shall be fully extinguished before the data drive electrodes are driven to the voltages for the next line of video.

A plasma is considered to have decayed fully (or to be fully extinguished) if the voltage stored by the active display element will change by less than 10 percent if the data voltage changes.

It can be shown that in the event that the display panel disclosed in U.S. Pat. No. 5,077,553 is used to display a video signal composed of 480 lines addressed at a frame rate of 60 Hz, the time that elapses between removing the strobe pulse in one channel and driving the data drive electrodes for the next line of the display is approximately 30 $\mu$s. Accordingly, the plasma created in a given channel must decay within approximately 30 $\mu$s after the strobe pulse is removed.

Helium is an advantageous choice for the gas to use in a plasma addressed liquid crystal display panel because it is inert and therefore does not react with the electrodes in the plasma channels. Also, helium is a favorable choice with respect to sputtering damage because the helium ions are light. However, use of helium as the ionizable gas in a PALC display panel is subject to the disadvantage that on recombination of a helium ion with an electron, the helium atom does not always pass immediately to the ground state, but it may remain for a significant period of time in a metastable state. If a metastable helium atom receives energy, e.g. from a collision with an electron or with another helium atom, the metastable helium atom might undergo secondary ionization, thus delaying complete extinction of the plasma.

One mechanism by which a metastable helium atom in a PALC display panel decays is through collision with the walls of the channel. In the case of a plasma addressed liquid crystal display panel suitable for an NTSC display, the dimensions of the channels are such that metastable helium atoms will collide with the walls of the channel and revert to the ground state at a sufficient rate that the plasma will be considered to be fully extinguished within 30 $\mu$s after removal of the strobe pulse. Accordingly, the existence of the metastable state does not significantly degrade operation of a plasma addressed liquid crystal display panel when driven by an NTSC signal.

In the event that the PALC display panel is to be used to provide an HDTV display, the number of lines of the display and the frequency at which the frame is refreshed are such that the plasma in a given channel must be reliably extinguished within about 8–16 $\mu$s after the pulse is removed from the cathode. If helium alone is used as the gas in the panel, the existence and persistence of the metastable states impairs the viewability of the display.

It has been found that if a suitable dopant gas is present in the panel, the extinction of the plasma is accelerated. The mechanism by which the dopant gas operates is not fully understood, but it is believed that it reduces the number of metastable atoms formed and/or hastens the decay of the metastable atoms. Several dopant gases have been evaluated.

Hydrogen is a dopant gas that is effective to accelerate extinction of the plasma. See U.S. Provisional Patent Application No. 60/022,002 (Attorney Docket USA 6242), the disclosure of which is hereby incorporated by reference herein. The hydrogen ion is light and so sputtering damage to the cathodes is small.

It has been found that a satisfactory high addressability image is displayed if hydrogen is present in a helium filling at a concentration, measured in partial pressure, in the range from about 0.01 percent to 20 percent in a total chamber pressure between 50 mB and 500 mB. Thus, the partial pressure of hydrogen is between about 0.005 mB and about 100 mB.

An HDTV display panel would typically have 1,200 channels. In the case of the channels each being about 40 cm long, the total volume of the channels would be about 0.05 liters. If the total pressure in the chamber is 200 mB and the partial pressure of hydrogen is 2 mB, the quantity of hydrogen present at 300 K is about 0.7 mB liter (1,000 mB liter is the quantity of gas at standard temperature and pressure occupying one liter). A possible disadvantage to use of hydrogen as the dopant gas is that hydrogen particles may be highly reactive, and therefore the hydrogen is consumed by reaction with the electrode material. It has been estimated that hydrogen is consumed by reaction with the electrode material at the rate of $1\times10^{-6}$ mB liter/hour/cm channel length. The maximum rate of consumption for such an HDTV display panel would be about $50\times10^{-3}$ mB liter/hour and 0.1 mB liter would therefore be consumed in about two hours. Thus, the viewability of the panel may deteriorate to an unacceptable degree after only a few hours of operation. If the concentration of hydrogen were increased to 15 percent (36 mB partial pressure of hydrogen and total pressure of 240 mB), the quantity of hydrogen would be about 1.8 mB liter and this would be consumed in approximately 36 hours.

It is generally accepted that in order for a television display panel to be commercially acceptable, it must operate for at least 10,000 hours (corresponding to a useful life of about 10 years) without significant degradation in the quality of the display. In order to maintain the partial pressure of hydrogen at 36 mB over 10,000 hours of use, a total hydrogen capacity of 500 mB liter would be needed, having a mass of about 60 mg, or about 280 times the amount needed to charge the panel to a partial pressure of 36 mB. For a panel having channels of length other than 40 cm, the mass of hydrogen required to maintain the partial pressure of hydrogen at 36 mB over 10,000 hours of use scales in accordance with the length of the channels.

It has been proposed in accordance with U.S. Provisional Patent Application No. 60/022,002 that a quantity of hydrogen storage material should be provided in communication with the plasma channels of a PALC display panel.

SUMMARY OF THE INVENTION

It has been discovered, in accordance with the invention, that the useful life of a PALC panel with cathodes coated with $LaB_6$ and having a hydrogen storage material in communication with the plasma channels to maintain a concentration of hydrogen in the range from 0.01 to 10% (measured in partial pressure), preferably 0.5 to 5%, and more preferably 1 to 3%, in a filling of helium is extended substantially if the anodes have a surface layer that is of uniform composition and has a high electrical conductivity.

If a coating of $LaB_6$ is formed on the cathodes by cafaphoretic deposition, the coating is not uniform but has, on the contrary, a significant degree of granularity. The invention necessitates that if the cathodes have a coating of cataphoretically deposited $LaB_6$, the anodes should be of different structure from the cathodes and, in particular, should ideally not be coated with $LaB_6$.

In accordance with a first aspect of the invention there is provided a channel structure for a PALC panel, comprising a channel member defining at least one channel, at least one cathode having an upper surface exposed in said one channel, at least one anode having an upper surface exposed in said one channel, and said upper surface of said one anode being of substantially uniform composition and having a conductivity perpendicular to said upper surface of at least about $10^{-4}$ ohm$^{-1}$ cm$^{-1}$.

In accordance with a second aspect of the invention there is provided a channel structure for a PALC panel, comprising a channel member defining at least one channel, and at least one cathode and at least one anode each having an upper surface exposed in said one channel for establishing an electric field in the channel between the anode and the cathode, and wherein said upper surface of the anode is of substantially uniform composition and has a conductivity of at least about $10^{-4}$ ohm$^{-1}$ cm$^{-1}$ parallel to the field established in the channel.

In accordance with a third aspect of the invention there is provided a channel subassembly for a PALC panel comprising a channel structure defining a plurality of channels, a cover sheet attached to the channel structure, a gas filling in the channels defined by the channel structure and the cover sheet, the gas filling containing helium doped with hydrogen at a concentration in the range from about 0.01% to about 10%, at least one cathode exposed in each channel, and at least one anode exposed in each channel, each anode having a surface layer of substantially uniform composition and having a conductivity of at least about $10^{-4}$ ohm$^{-1}$ cm$^{-1}$.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to designate corresponding components.

DETAILED DESCRIPTION

Figure 1:
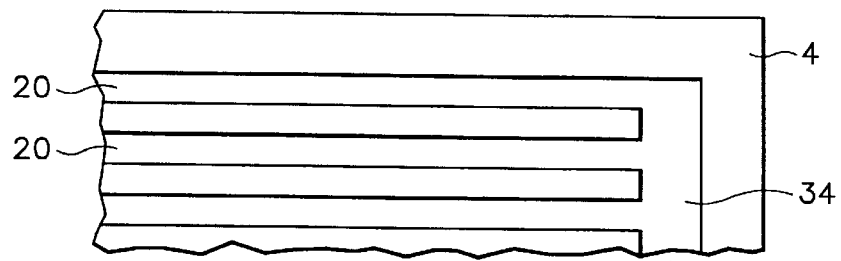
FIG. 1 is a partial schematic illustration of a PALC display panel in accordance with the present invention.

FIG. 1 shows the plasma channels 20 formed in the channel member 4 of a PALC HDTV display panel. The channel member 4 may be fabricated using any suitable method, such as one of the three methods mentioned above. The plasma channels 20 communicate with a manifold channel 34. The manifold channel communicates in a manner not shown in FIG. 1 with a container 38, which is outside the display field. The container 38 contains a body 42 of hydrogen storage material. Hydrogen storage materials store hydrogen by incorporating the hydrogen into the molecular structure of the material. Such hydrogen storage materials are well known and are commercially used as hydrogen getters.

Figure 2:
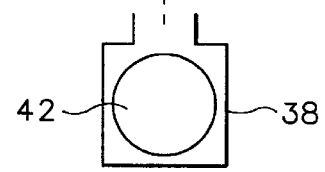
FIG. 2 is a partial sectional view of a first PALC panel in accordance with the invention.
Figure 2:
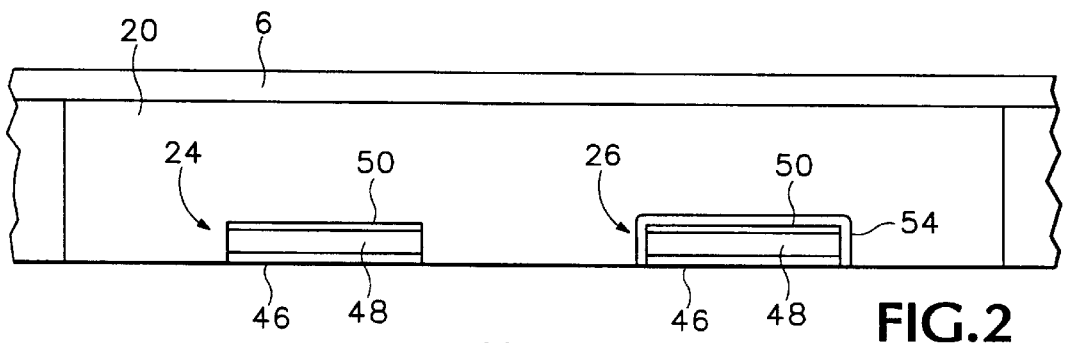

In accordance with the invention, the anodes 24 (not shown in FIG. 1) in the channels 20 are of different structure from the cathodes 26. FIG. 2 illustrates schematically the structure of the electrodes in a channel 20 of the PALC display panel shown in FIG. 1 in the case of the channel member 4 having been formed by screen printing various pastes on the upper surface of a glass substrate to form the electrodes and the rib blocks. As shown in FIG. 2, the anode and the cathode each comprise an adhesion layer 46, a bulk layer 48, and a protective top layer 50. The layers 46, 48 and 50 are conductive and are uniform in composition over the length of the electrode.

The cathode 26 has a coating 54 of refractory material in order to protect it from sputtering damage. The coating 54 is formed by cataphoretic deposition of LaB$_6$. There is no coating over the protective top layer 50 of the anode 24. Thus, when the channel member is placed in a cataphoretic deposition cell in order to deposit the coating of LaB$_6$ on the cathodes, and the cathodes are connected to the negative terminal of the cataphoretic deposition voltage source, the anodes float because they are not connected to any terminal or, alternatively, they are connected to a terminal that is at a positive potential relative to the negative terminal of the cataphoretic deposition voltage source, such as the positive terminal of the cataphoretic deposition voltage source or a terminal that is biased positive relative to the positive terminal. In this manner, the possibility of a significant quantity of LaB$_6$ being deposited on the anodes is avoided.

Even though the anodes are not connected to the negative terminal of the cataphoretic deposition voltage source, some small amount of LaB$_6$ may be deposited on the anodes. Further, in the event that the protective top layer of the electrode structure is an oxidizable metal, such as aluminum, the top layer may undergo oxidation during the cataphoretic deposition process. Therefore, after the refractory coating has been formed on the cathodes, the electrodes may be subjected to a light sputtering operation to remove any LaB$_6$ or oxide formed on the anodes.

The cover sheet 6 is then attached to the channel member 4 to form the channel subassembly. At this point, the interior space of the container 38 and the interior space of the channel member are sealed from the exterior of the channel subassembly and form a closed panel chamber. A filling of helium and hydrogen is introduced into the panel chamber. The channel subassembly is attached to the upper substrate subassembly, composed of the upper substrate 14, the data drive electrodes 12 and the layer 10 of liquid crystal material, to complete the PALC display panel.

As hydrogen is consumed through use of the panel, the partial pressure of hydrogen in the panel chamber falls; and hydrogen is released by the storage material and equilibrium is established at a slightly reduced partial pressure and slightly reduced concentration. The quantity of hydrogen storage material in the body 42, and the concentration (mB liter of hydrogen/gram of storage material) to which the storage material is charged when the channel subassembly is fabricated, are selected so that the concentration of hydrogen in the panel chamber, measured in terms of partial pressure of hydrogen relative to total chamber pressure, remains in the range between 0.01 and 10 percent, preferably between 0.5 and 5 percent, and more preferably between 1 and 3 percent.

Figure 2A:
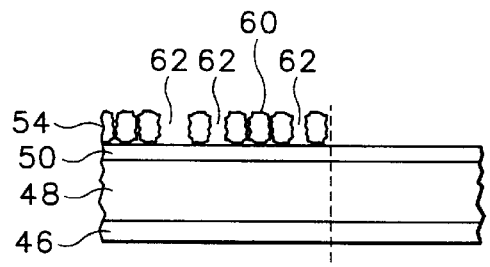
FIG. 2A is an enlarged view of a detail of FIG. 2.

It has been found that when a display panel is constructed using a channel subassembly that has been fabricated in the manner described above, so that the anodes are not coated with a refractory compound but have a highly conductive top layer, and the panel is operated with a helium filling doped with hydrogen at the concentration described above, the useful life of the completed panel is extended relative to a panel constructed using a channel subassembly in which the anodes are of the same structure as the cathodes. The reason for the difference in useful life is believed to be attributable to the fact that the top layer of the anodes has a uniform electrical conductivity and the conductivity of the top layer is at least $10^{-4}$ ohm$^{-1}$ cm$^{-1}$. Thus, referring to FIG. 2A, in which an electrode structure having a coating 54 of LaB$_6$ is illustrated on the left and an electrode structure without a coating of LaB$_6$ is illustrated on the right, it is believed that the coating 54 is composed of large particles 56 that are not distributed uniformly over the surface of the electrode, so that some of the particles are close together, as shown at 60, and there are spaces, as shown at 62, between other particles. In the event that the structure illustrated on the left of FIG. 2A is used for the anode, the resistance that is presented in the regions 62 to electrons passing from the plasma is substantially higher than that presented in the spaces 60, where the top layer 50 is exposed to the plasma, so that electrons from the plasma pass to the bulk layer 48 preferentially through the spaces 62. It is believed that the plasma tends to separate into discrete regions along the electrodes instead of being uniform along the electrodes and that this contributes to premature failure of the display panel. In the case of the structure illustrated on the right of FIG. 2A, the layer 50 provides a low resistance path from the plasma to the bulk layer 48 over the entire area of the anode.

Electrical conductivity is the fraction that has the magnitude of the current density vector as numerator and the magnitude of the electric field vector as denominator. In an isotropic material, the direction of the current density vector is the same as the direction of the electric field vector and electrical conductivity is independent of the direction of the electric field vector; and accordingly electrical conductivity is a scalar quantity. However, in the general case, conductivity is a tensor because the direction of the current density vector does not necessarily coincide with the direction of the electric field vector and conductivity depends on the direction of the electric field vector.

In the case of the anode shown in FIG. 2, two elements of the conductivity tensor are significant, and these can be designated $\sigma_\parallel$, which relates the magnitude of the current density vector to the electric field parallel to the length of the anode, and $\sigma_\perp$, which relates the magnitude of the current density to the electric field perpendicular to the surface of the anode, i.e. parallel to the field established between the cathode and the anode (in the case of a perfect conductor) at the surface of the anode. In the case of the present invention, it is necessary that the element $\sigma_\perp$ for the top layer be high and uniform over the area of the anode, in order to ensure that electrons from the plasma can reach the bulk layer with minimum resistance. Further, the element $\sigma_\parallel$ of the anode material should be high in order to provide a low resistance path for electrons along the anode.

For most metals, the electrical resistivity (the reciprocal of conductivity) is in the range from about 2 to about 100 ohm cm. In order for the conductivity element $\sigma_\parallel$ or $\sigma_\perp$ to be considered high, the corresponding element of the resistivity tensor should be no higher than about 10,000 ohm cm.

Accelerated life tests conducted on a PALC display panel having the anode structure described above and having a helium filling doped with hydrogen show that the operating life of the panel can be at least 10,000 hours.

Figure 3:
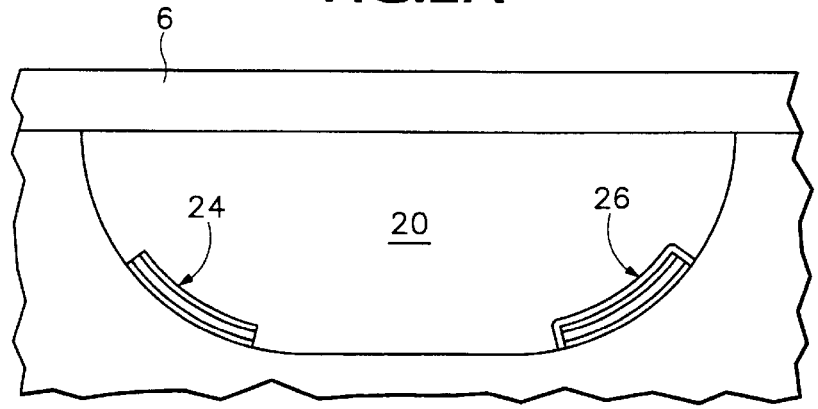
FIG. 3 is a similar view of a second PALC panel in accordance with the present invention.
Figure 4:
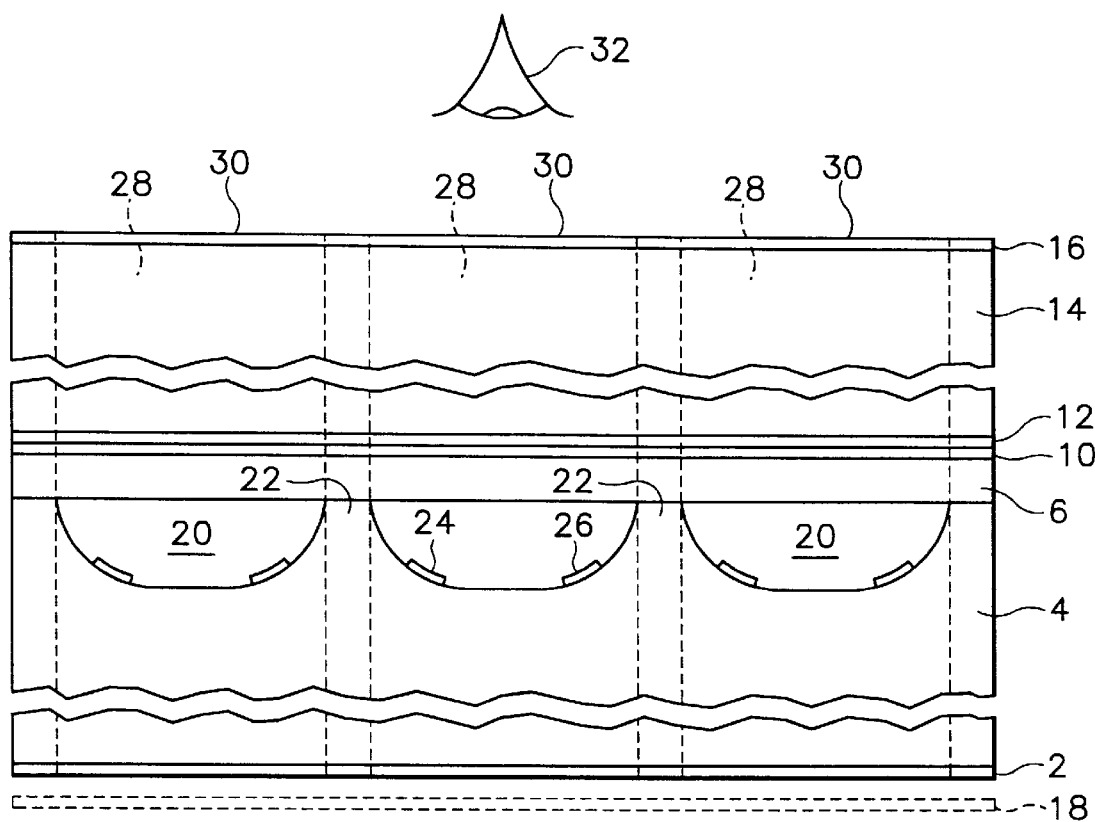
FIG. 4 is a sectional view of a PALC panel in accordance with the prior art.

FIG. 3 illustrates schematically the structure of the electrodes in a channel 20 of a PALC display panel in which the channel member has been formed by etching channels in the upper surface of a glass substrate and subsequently forming the electrodes in the channels using photolithographic techniques. As shown in FIG. 3, the electrodes may comprise an adhesion layer of chromium, a bulk layer of copper and a protective top layer of chromium. As in the case of FIG. 2, the cathode 26 has a coating of refractory material whereas the upper surface of the anode 24 has high conductivity and its conductivity is uniform over the area of the anode.

It will be appreciated that the invention is not restricted to the particular embodiments that have been described, and that variations may be made therein without departing from the scope of the invention as defined in the appended claims and equivalents thereof.

What is claimed is:

1. A channel structure for a plasma addressed liquid crystal panel, comprising a channel member defining at least one channel, at least one cathode having an upper surface exposed in said one channel, and at least one anode having an upper surface exposed in said one channel, said upper surface of said one anode being of substantially uniform composition and having a conductivity perpendicular to said upper surface of at least about $10^{-4}$ ohm$^{-1}$ cm$^{-1}$.

2. A channel structure according to claim 1, wherein the cathode has a metal-based core and a coating of refractory material.

3. A channel structure according to claim 1, wherein the anode has a metal-based core and a metal top layer.

4. A channel structure for a PALC panel, comprising a channel member defining at least one channel, and at least one cathode and at least one anode each having an upper surface exposed in said one channel for establishing an electric field in the channel between the anode and the cathode, and wherein said upper surface of the anode is of substantially uniform composition and has a conductivity of at least about $10^{-4}$ ohm$^{-1}$ cm$^{-1}$ parallel to the field established in the channel.

5. A channel structure according to claim 4, wherein the cathode has a metal-based core and a coating of refractory material.

6. A channel structure according to claim 4, wherein the anode has a metal-based core and a metal top layer.

7. A channel subassembly for a PALC panel comprising:

a channel structure defining a plurality of channels, a cover sheet attached to the channel structure, a gas filling in the channels defined by the channel structure and the cover sheet, the gas filling containing helium doped with hydrogen at a concentration in the range from about 0.01% to about 10%, at least one cathode exposed in each channel, and at least one anode exposed in each channel, each anode having a surface layer of substantially uniform composition and having a conductivity of at least about $10^{-4}$ ohm$^{-1}$ cm$^{-1}$.

8. A channel subassembly according to claim 7, wherein the cathode has a metal-based core and a coating of refractory material.

9. A channel subassembly according to claim 7, wherein the anode has a metal-based core and a metal top layer.

10. A channel subassembly according to claim 7, wherein the gas filling contains hydrogen at a concentration in the range from about 0.5 percent to about 5 percent.

11. A channel subassembly according to claim 7, wherein the gas filling contains hydrogen at a concentration in the range from about 1 percent to about 3 percent.

* * * * *